Figure 1:
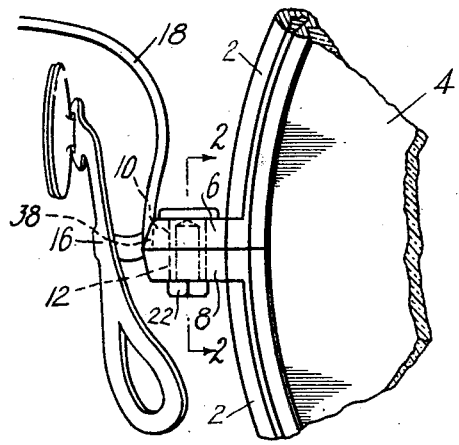

April 9, 1929. F. A. STEVENS 1,708,206
OPHTHALMIC MOUNTING
Filed Feb. 19, 1923 2 Sheets-Sheet 1

Inventor:
Frederick A. Stevens.
by David Rines
Attorney:-

April 9, 1929.  F. A. STEVENS  1,708,206
OPHTHALMIC MOUNTING
Filed Feb. 19, 1923   2 Sheets-Sheet 2
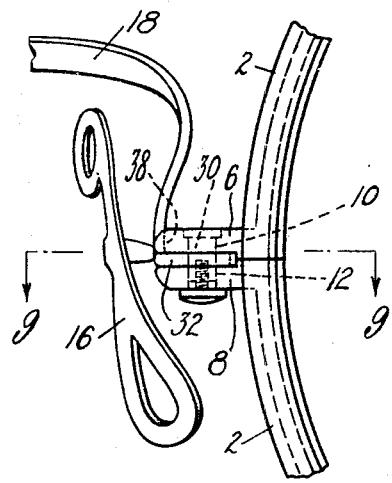
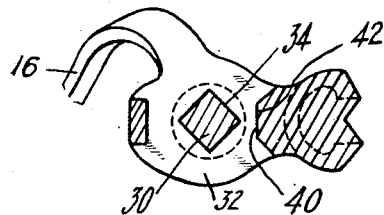
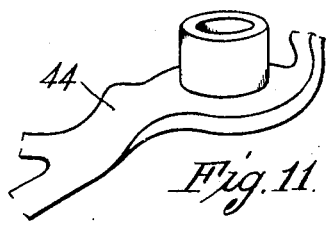
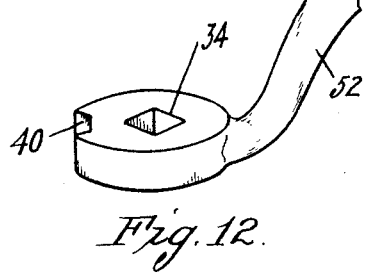
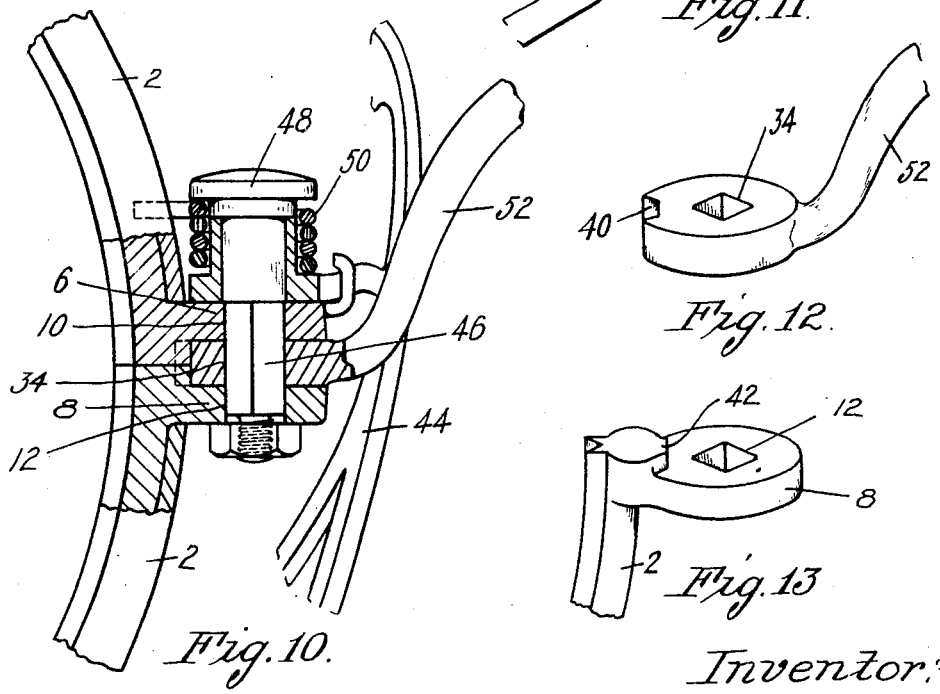
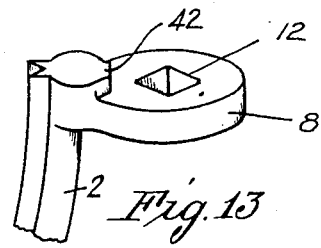
Inventor:
Frederick A. Stevens.
by David Rines
Attorney.

Patented Apr. 9, 1929.

1,708,206

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed February 19, 1923. Serial No. 619,331.

The present invention relates to ophthalmic mountings, and more particularly to eyeglass mountings of the type in which the lens rims are split at the point of juncture with the bridge.

An object of the invention is to provide improved means for preventing relative movement of the ends of the split rim and in the case of eyeglass mountings, of the guards and the bridge, thereby eliminating the danger of chipping the lenses, and of disturbing the relative adjustment of the guards and the bridge.

To the attainment of this and other objects, as will appear from the following description, taken in connection with the accompanying drawings, the invention consists of the improved ophthalmic mounting hereinafter described, illustrated in the drawings and defined in the appended claims.

Figure 2:
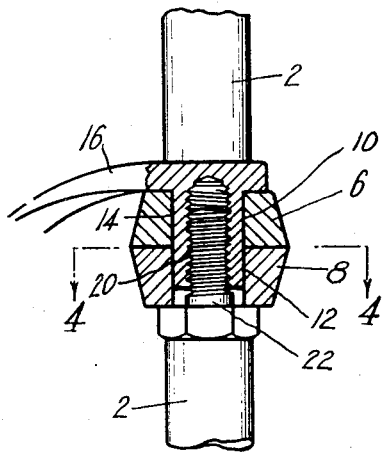
Figure 3:
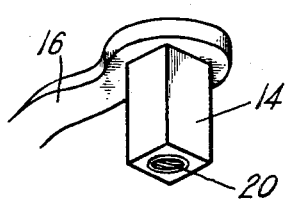
Figure 4:
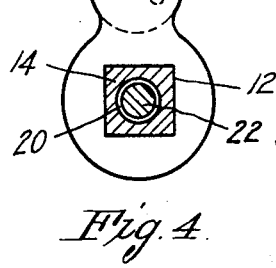
Figure 5:
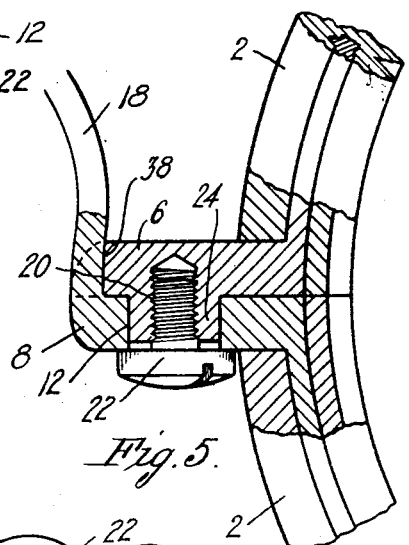
Figure 6:
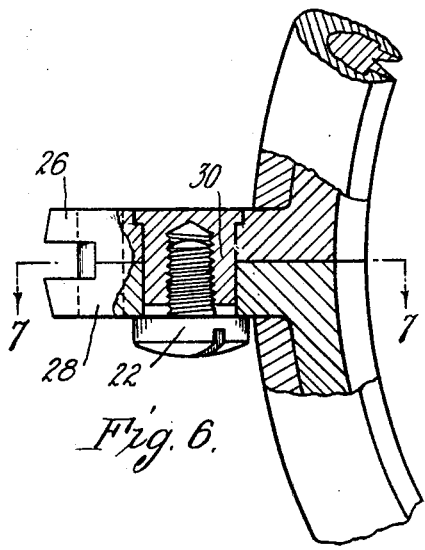
Figure 7:
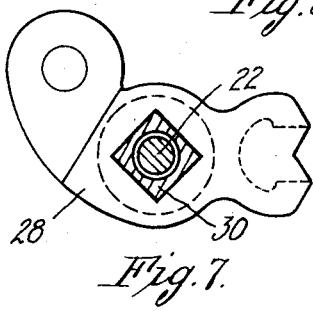

In the drawings, Fig. 1 is a fragmentary view of an ophthalmic mounting illustrating a preferred embodiment of the invention; Fig. 2 is a sectional view, taken upon the line 2—2 of Fig. 1, looking in the direction of the arrows; Fig. 3 is a fragmentary perspective view of a preferred guard; Fig. 4 is a section, taken upon the line 4—4 of Fig. 2, looking in the direction of the arrows; Figs. 5 and 6 are views of modifications; Fig. 7 is a section taken upon the line 7—7 of Fig. 6, looking in the direction of the arrows; Fig. 8 is a view of another modification; Fig. 9 is a section taken upon the line 9—9 of Fig. 8, looking in the direction of the arrows; Fig. 10 is a view of a further modification; and Figs. 11, 12 and 13 are perspective views of parts shown in Fig. 10.

The invention is illustrated in its preferred form in Figs. 1 to 4 as embodied in an eyeglass mounting comprising a split rim 2 for a lens 4. The end pieces 6 and 8 of the rim are provided with alined polygonal openings 10 and 12. A polygonal member 14 is adapted to enter the openings 10 and 12 to prevent relative movement of the end pieces. The possibility of chipping the lenses by reason of such movement is thus eliminated. The openings 10 and 12 are preferably square and the member 14, therefore, is preferably of square cross section. The member 14 is shown in Fig. 3 as an integral projection upon a guard 16, so that the guard thus serves to prevent relative movement, not only of the end pieces, but of the guard itself, as well. As the bridge 18 is shown rigid or integral with one of the end pieces, as the end piece 8, relative movement of the guard and the bridge is thus prevented by the guard. The relative adjustment of the guard with respect to the bridge is therefore not subject to the disturbances inherent in present-day eyeglasses in which such relative movement is not prevented. The projection 14 is provided with a screw-threaded opening 20 adapted to receive a screw 22 for securing together the end pieces and the guard.

In Fig. 5, a feature of the invention is shown in connection with a guardlesss mounting. Here the end piece 6 is shown integrally provided with a polygonal projection 24 that extends into the polygonal opening 12 of the end piece 8. The screw 22 is threaded into a threaded opening 20 that is provided in the projection 24, and thus holds the end pieces 6 and 8 together. Relative movement of the end pieces is prevented by the polygonal projection 24.

In Figs. 6 and 7, a feature of the invention is shown in connection with a temple end-piece construction; temple end pieces being shown at 26 and 28. An interiorly threaded, polygonal projection 30 may be provided upon one of the end pieces, as the end piece 26, cooperating with the screw 22 to hold the end pieces 26 and 28 together and to prevent their relative movement. The polygonal projection 30 may be integral with the end piece 26, as illustrated, in Fig. 5, or may be separate therefrom, as shown in Figs. 1 to 4. A separate projection is illustrated in Figs. 6 and 7.

A separate polygonal projection 30 is shown also in the modification illustrated in Figs. 8 and 9, in which the bridge 18 is shown detached from the rim and provided with an end piece 32 that is mounted between the end pieces 6 and 8 of the rim 2. The separate polygonal projection 30 extends through the polygonal openings 10 and 12 of the end pieces 6 and 8, and also through a polygonal opening 34 in the bridge end piece 32. In this modification, the guard 16 is shown integral with the bridge.

In Figs. 1, 5 and 8, the bridge 18 is shown bent abruptly to enter a recess 38 in the end of the end piece 6. The bridge 18 engages the walls of the recess 38, helping to lock the bridge and the end pieces against relative pivotal movement. In Figs. 8 and 9, the end of the end piece 32 of the separate bridge is shown provided also with a recess 40 the walls of which are shaped to lock against a correspondingly shaped shoulder 42 that is provided upon the rim 2. The polygonal shape of the projection 30 and of the openings in which it is mounted may be made round in this modification if it is desired to rely wholly upon the holding action of the walls of the recess 38 on the bridge, or of the recess 40 on the shoulder 42.

A separable bridge is shown also in Figs. 10 to 13, but combined with a spring-pressed guard 44. The polygonal projection 30 is replaced by a post 46, the lower polygonal portion of which extends through the polygonal openings 10, 34 and 12 in the end pieces and the bridge, and the upper cylindrical post of which serves as a bearing for the guard 44. The guard 44 is mounted in position about the bearing portion between the end piece 6 and the head 48 of the post 46, and is actuated by the customary spring 50. The construction is otherwise the same as in Figs. 8 and 9, except that, the separable bridge 52 being of a different type, it is not shown locked in place in a recess 38, as in Figs. 8 and 9. The recess 40 and the shoulder 42 are, however, employed with the polygonal recess 34 to help lock the parts together.

The invention is obviously applicable to many different types of mountings. The mounting forming the subject matter of Patent No. 1,293,232, February 4, 1919, is illustrated in Figs. 1, 4 and 5. A different type of construction is shown in Figs. 6 to 13.

It will be understood that the invention is not restricted to the exact embodiments thereof that are herein illustrated and described, and that modifications may be made therein without departing from its spirit and scope as defined in the appended claims.

What is claimed is:

1. An eyeglass mounting having, in combination, a split lens rim the ends of which are provided with polygonal openings, a guard having a polygonal projection adapted to enter the openings to prevent relative lateral movement of the ends of the rim, the guard having a portion adapted to engage one of the ends of the rim, and means adapted to engage the other end of the rim and cooperating with the guard to prevent separation of the ends of the rim.

2. An eyeglass mounting having, in combination, a split lens rim having end pieces provided with alined, square openings, a bridge, a guard having a projection of square cross section adapted to enter the openings to prevent relative lateral movement of the ends of the rim and of the guard and the bridge, said projection being provided with a screw-threaded opening, and a screw adapted to be screwed into the screw-threaded opening to secure the ends of the rim and the guard together.

In testimony thereof, I have hereunto subscribed my name this 16th day of February, 1923.

FREDERICK A. STEVENS.